(12) United States Patent
Chang et al.

(10) Patent No.: US 11,541,687 B2
(45) Date of Patent: Jan. 3, 2023

(54) COMPOSITE RIM AND REINFORCED PREPREG THEREOF

(71) Applicant: GIANT MANUFACTURING CO., LTD., Taichung (TW)

(72) Inventors: Chih-Kai Chang, Taichung (TW); Yao-Tun Chiang, Taichung (TW); Ching-Yao Lin, Taichung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 539 days.

(21) Appl. No.: 16/420,177

(22) Filed: May 23, 2019

(65) Prior Publication Data

US 2019/0358996 A1     Nov. 28, 2019

Related U.S. Application Data

(60) Provisional application No. 62/675,782, filed on May 24, 2018.

(30) Foreign Application Priority Data

May 6, 2019    (TW) ................................ 108115611

(51) Int. Cl.
     *B60B 21/08*      (2006.01)
     *F16D 69/02*      (2006.01)

(52) U.S. Cl.
     CPC ............ *B60B 21/08* (2013.01); *F16D 69/026* (2013.01); *B60B 2360/341* (2013.01); *B60B 2900/111* (2013.01); *B60B 2900/112* (2013.01)

(58) Field of Classification Search
CPC .. B60B 21/08; B60B 2360/341; F16D 69/026
See application file for complete search history.

(56) References Cited

U.S. PATENT DOCUMENTS

| | | | | |
|---|---|---|---|---|
| 2006/0267397 A1* | 11/2006 | Possarnig | ............. | B60B 21/062 301/95.102 |
| 2007/0102992 A1* | 5/2007 | Jager | ..................... | B60B 21/025 301/30 |
| 2012/0056468 A1* | 3/2012 | Tsai | ........................ | B60B 5/02 301/95.103 |
| 2014/0015307 A1* | 1/2014 | Poertner | .................. | B60B 1/02 301/6.9 |
| 2014/0117745 A1* | 5/2014 | Wilke | ....................... | B60B 5/02 301/6.9 |
| 2014/0167384 A1* | 6/2014 | Chuang | ................... | B60B 21/08 280/281.1 |
| 2016/0010780 A1* | 1/2016 | Withers | .............. | F16L 55/1656 156/60 |

(Continued)

FOREIGN PATENT DOCUMENTS

| CN | 101200551 A | | 6/2008 |
|---|---|---|---|
| CN | 101423618 A | * | 5/2009 |

(Continued)

*Primary Examiner* — Kip T Kotter
(74) *Attorney, Agent, or Firm* — CKC & Partners Co., LLC

(57) ABSTRACT

A reinforced prepreg which is applied to a wear-resistant layer structure of a braking track is provided. The reinforced prepreg includes a fiber fabric and a mixture mixed with the fiber fabric. The mixture includes a resin and a plurality of needle-shaped crystals having microscale or nanoscale sizes mixed with the resin.

13 Claims, 10 Drawing Sheets

(56) References Cited

U.S. PATENT DOCUMENTS

2016/0303903 A1* 10/2016 Kashimoto ............... B60B 5/02
2017/0349004 A1* 12/2017 Iwai ......................... B60B 5/02

FOREIGN PATENT DOCUMENTS

| CN | 101498052 A | 8/2009 |
| CN | 103921618 A | 7/2014 |
| CN | 106051002 A | 10/2016 |
| CN | 107075861 A | 8/2017 |
| JP | S63278809 A | 11/1988 |

* cited by examiner

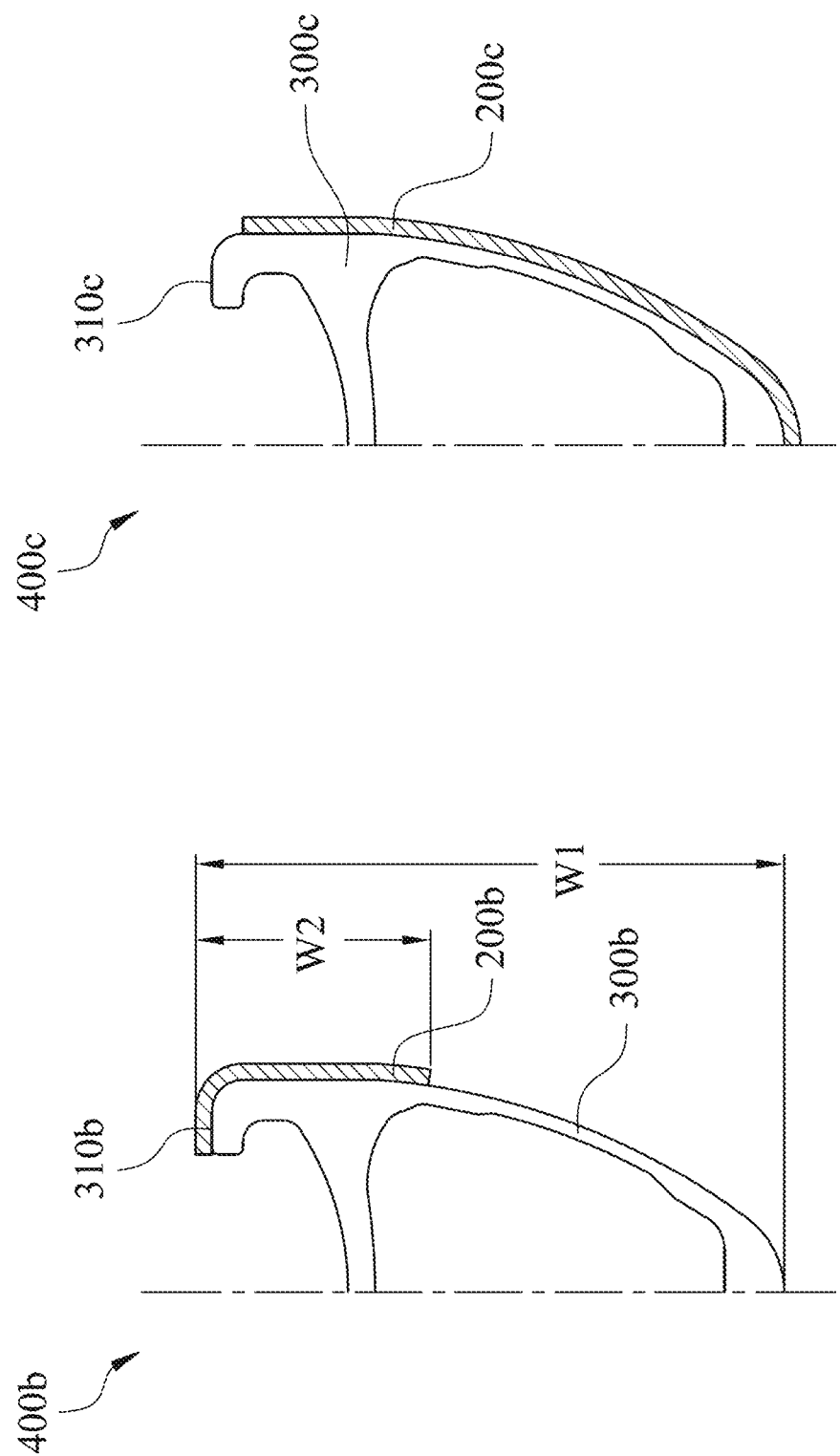

COMPOSITE RIM AND REINFORCED PREPREG THEREOF

RELATED APPLICATIONS

This application claims priority to U.S. Provisional Application Ser. No. 62/675,782, filed May 24, 2018, and Taiwan Application Serial Number 108115611, filed May 6, 2019, the disclosures of which are incorporated herein by reference in their entireties.

BACKGROUND

Technical Field

The present disclosure relates to a wear-resistant layer structure of a braking track and a reinforced prepreg thereof. More particularly, the present disclosure relates to a wear-resistant layer structure of a braking track and a reinforced prepreg thereof applied to a composite rim.

Description of Related Art

Brakes of bicycles can be roughly divided into two types, disc brakes and caliper brakes. The difference between the two types of brakes is how they generate force. The disc brake uses two pads to push against a disc to lower the speed of a bicycle. The caliper brake uses rubber brake shoes to push against a braking track of a rim to generate friction between the rubber brake shoes and the rim such that the speed can be reduced. Due to the mechanism of the disc brake is so complex, the disc brake is too heavy to be beneficial for lightweight carbon fiber composite bicycles. Oppositely, the mechanism of the caliper brake is simple, which is relatively favorable for reducing weight and lowering the cost.

However, the caliper brake uses the rubber brake shoes to directly push against the braking track of the rim to generate friction between the rubber brake shoes and the rim to lower the speed, damage of both of the braking track of the rim and the rubber brake shoes would be occurred thereon. Especially, unrecoverable damage will be generated on the surface of the composite rim, such as a carbon fiber/epoxy composite rim. As a result, it would lead to the defects, such as fiber exposure, grooves, destruction of the rim, etc., and safety concerns will occur when the rider uses the brake. Furthermore, sand from the wet mud will stick between the rubber brake shoes and the rim when riding in a raining day or in a bad circumstance. When the rubber brake shoes are pushed against the rim in such condition, the sand will scratch the surface of the composite rim; thus, annular grooves appear at the braking track.

A conventional way to reinforce the braking track of the composite rim is to form a surface layer with certain thickness (about 0.1 mm to 0.3 mm) thereon. The surface layer is usually made from a carbon fiber fabric prepreg, a glass fiber fabric pregreg or a basalt fiber fabric prepreg. The wear resistance of the fiber material of the surface layer such as the carbon fiber, the glass fiber or the basalt fiber is not better than the unidirectional carbon fiber layers of the composite rim. Therefore, the thickness of the surface layer may be increased in order to defer the generation of the damage. However, such kinds of ways are not good solutions. Even though the surface layer made from carbon fiber fabric could provide basic protection, the weight is increased accordingly, and the damage prevention of the composite rim is so limited. Moreover, even if the sloughing, scratches or grooves brought by the damage will not decrease the strength of the wheel immediately, it will bring inconsistent braking performance and bad feelings to consumers. Furthermore, consumers may have service complaints, and may lose their will to buy such products with quality and safety concerns.

Based on the abovementioned problems, how to improve the abradability of the braking track of the composite rim to meet the lightweight requirement becomes a pursuit target for practitioners.

SUMMARY

A reinforced prepreg which is applied to a wear-resistant layer structure of a braking track includes a fiber fabric and a mixture mixed with the fiber fabric. The mixture includes a resin and a plurality of needle-shaped crystals having microscale or nanoscale sizes mixed with the resin.

A wear-resistant layer structure of a braking track which is applied to a surface of a composite rim includes a fiber fabric and a mixture mixed with the fiber fabric. The mixture includes a resin and a plurality of needle-shaped crystals having microscale or nanoscale sizes mixed with the resin.

BRIEF DESCRIPTION OF THE DRAWINGS

The disclosure can be more fully understood by reading the following detailed description of the embodiments, with reference made to the accompanying drawings as follows:

FIG. 4B shows a partial cross-sectional view of a wear-resistant layer structure of a braking track applied to a composite rim according to still yet another embodiment of the present disclosure.

FIG. 4C shows a partial cross-sectional view of a wear-resistant layer structure of a braking track applied to a composite rim according to still yet another embodiment of the present disclosure.

DETAILED DESCRIPTION

The embodiments will be described with the drawings. For clarity, some practical details will be described below. However, it should be noted that the present disclosure should not be limited by the practical details. In other words, in some embodiments, the practical details are for exemplary illustrations only. In addition, for simplifying the drawings, some conventional structures and elements will be simply illustrated; and repeated elements may be represented by the same labels.

It will be understood that when an element (or mechanism or module) is referred to as be "disposed on", "connected to" or "coupled to" another element, it can be directly disposed on, connected or coupled to the other element, or it can be indirectly disposed on, connected or coupled to the other element, that is, other intervening elements may be present. In contrast, when an element is referred to as be "directly disposed on," "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1:
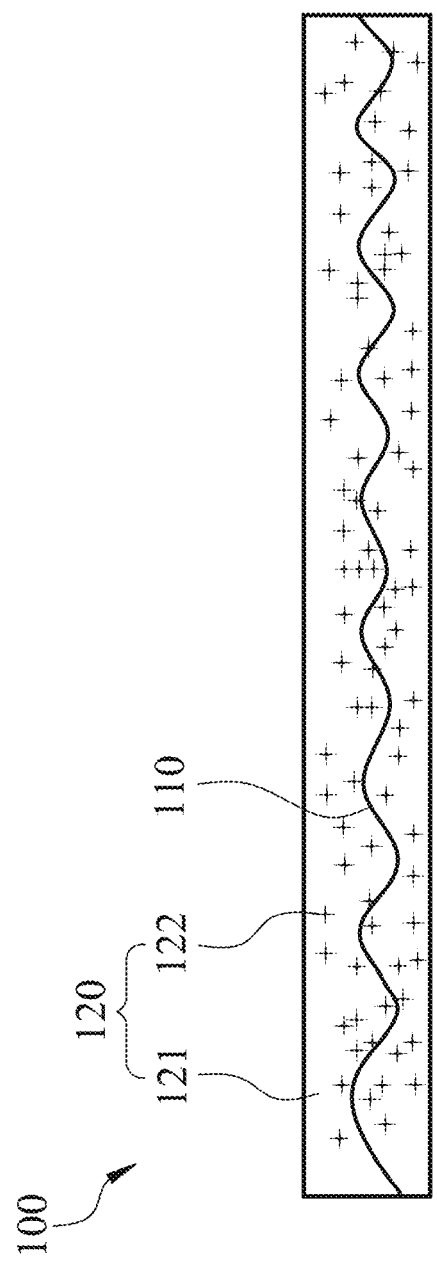
FIG. 1 shows a cross-sectional view of a reinforced prepreg according to one embodiment of the present disclosure.
Figure 2:
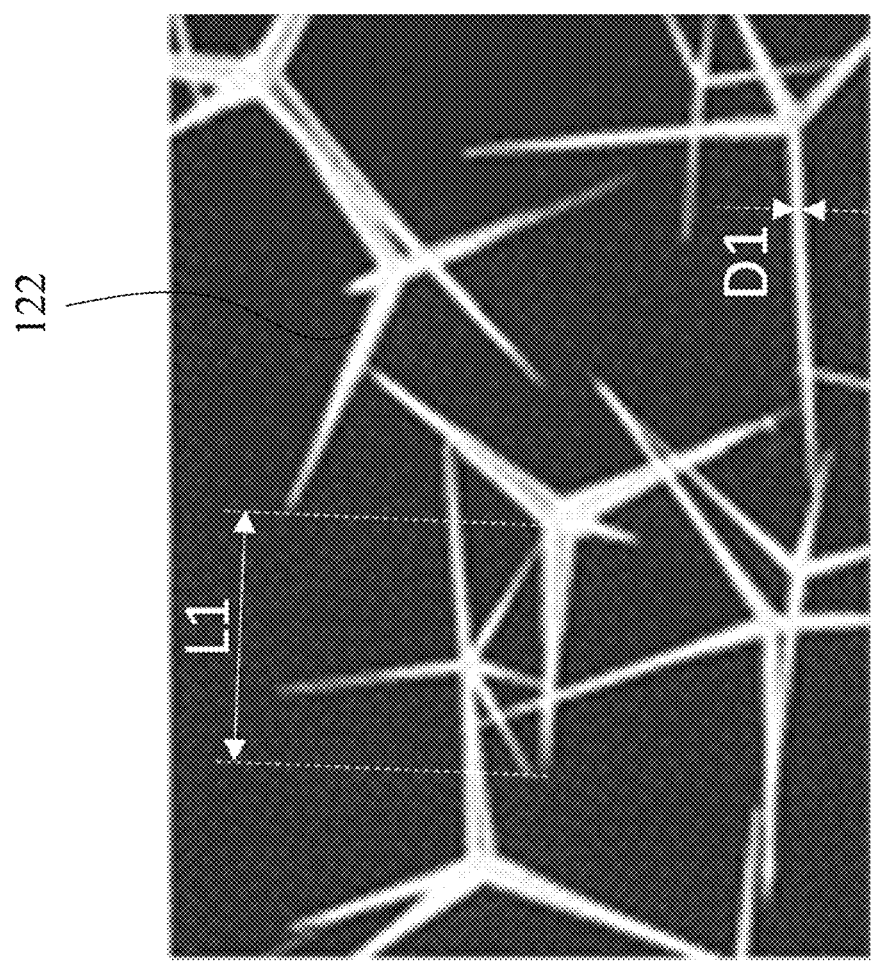
FIG. 2 shows a three dimensional schematic view of needle-shaped crystals of FIG. 1.

FIG. 1 shows a cross-sectional view of a reinforced prepreg 100 according to one embodiment of the present disclosure. FIG. 2 shows a three dimensional schematic view of needle-shaped crystals 122 of FIG. 1. The reinforced prepreg 100 which is applied to a wear-resistant layer structure of a braking track includes a fiber fabric 110 and a mixture 120 mixed with the fiber fabric 110. The mixture 120 includes a resin 121 and a plurality of needle-shaped crystals 122 having microscale or nanoscale sizes mixed with the resin 121.

Therefore, through mixing with the needle-shaped crystals 122, the abradability of the resin 121 can be improved. Additionally, the interfacial strength between the resin 121 and the fiber fabric 110 can be increased such that exposure and damage of the fiber fabric 110 can be prevented. The details of the reinforced prepreg 100 will be described in the following paragraphs.

The fiber fabric 110 can be made of liquid crystal polymer (LCP) fibers. In other words, LCP fibers are woven into the fiber fabric 110; hence, the fiber fabric 110 has characteristics of high abradability and high scratch resistance. In other embodiment, the fiber fabric can be made of carbon fibers, glass fibers or basalt fibers.

Preferably, the resin 121 of the mixture 120 can be the same resin material used in the composite rim where the reinforced prepreg 100 is applied. For example, if the composite rim is made from carbon fibers and an epoxy resin, the resin 121 can be an epoxy resin, too. Each of the needle-shaped crystals 122 can be composed of inorganic nonmetal materials, such as Zinc oxide (ZnO), Zinc sulfide (ZnS) or Magnesium oxide (MgO), or each of the needle-shaped crystals 122 can be composed of organic materials, metal or ceramics materials, such as aluminum oxide ($Al_2O_3$), silicon carbide (SiC) and silicon nitride (SiN). In the embodiment, the needle-shaped crystals 122 are composed of ZnO, and the needle-shaped crystals 122 has a tetrapod-shaped structure. Each of the needle-shaped crystals 122 has a needle diameter D1 and a needle length L1. The needle diameter D1 is within a range of 0.5 microns to 10 microns, and the needle length L1 is within a range of 10 microns to 100 microns. In other embodiment, each of the needle-shaped crystals can have, but not limited to, a monopod-shaped structure, a bipod-shaped structure or a tripod-shaped structure.

The abradability of the resin 121 can be improved by mixing the needle-shaped crystals 122. Additionally, the needle-shaped structure facilitates combination between the resin 121 and the fiber fabric 110 such that the low interfacial strength problem between the resin 121 and the fiber fabric 110 can be solved. Moreover, the overall abradability can be increased.

Furthermore, a weight percentage of the mixture 120 in the reinforced prepreg 100 is within a range of 30% to 60%. Preferably, the weight percentage of the mixture 120 in the reinforced prepreg 100 is within a range of 35% to 45%, and a content of the needle-shaped crystals 122 in the mixture 120 is within a range of 5 phr to 50 phr, i.e., 5 to 50 parts per hundred resin 121. Preferably, the content of the needle-shaped crystals 122 in the mixture 120 is within a range of 10 phr to 25 phr.

In other words, in one embodiment, a plurality of needle-shaped crystals 122 can be mixed evenly with the resin 121 to form the mixture 120, and the content of the needle-shaped crystals 122 in the mixture 120 is 15 phr; subsequently, the fiber fabric 110 is impregnated with the mixture 120 to form the reinforced prepreg 100. For exemplary illustration, the weight percentage of the mixture 120 in the prepreg 100 is, but not limited to, 45%, and a weight percentage of the fiber fabric 110 in the prepreg 100 is, but not limited to, 55%.

Figure 3:
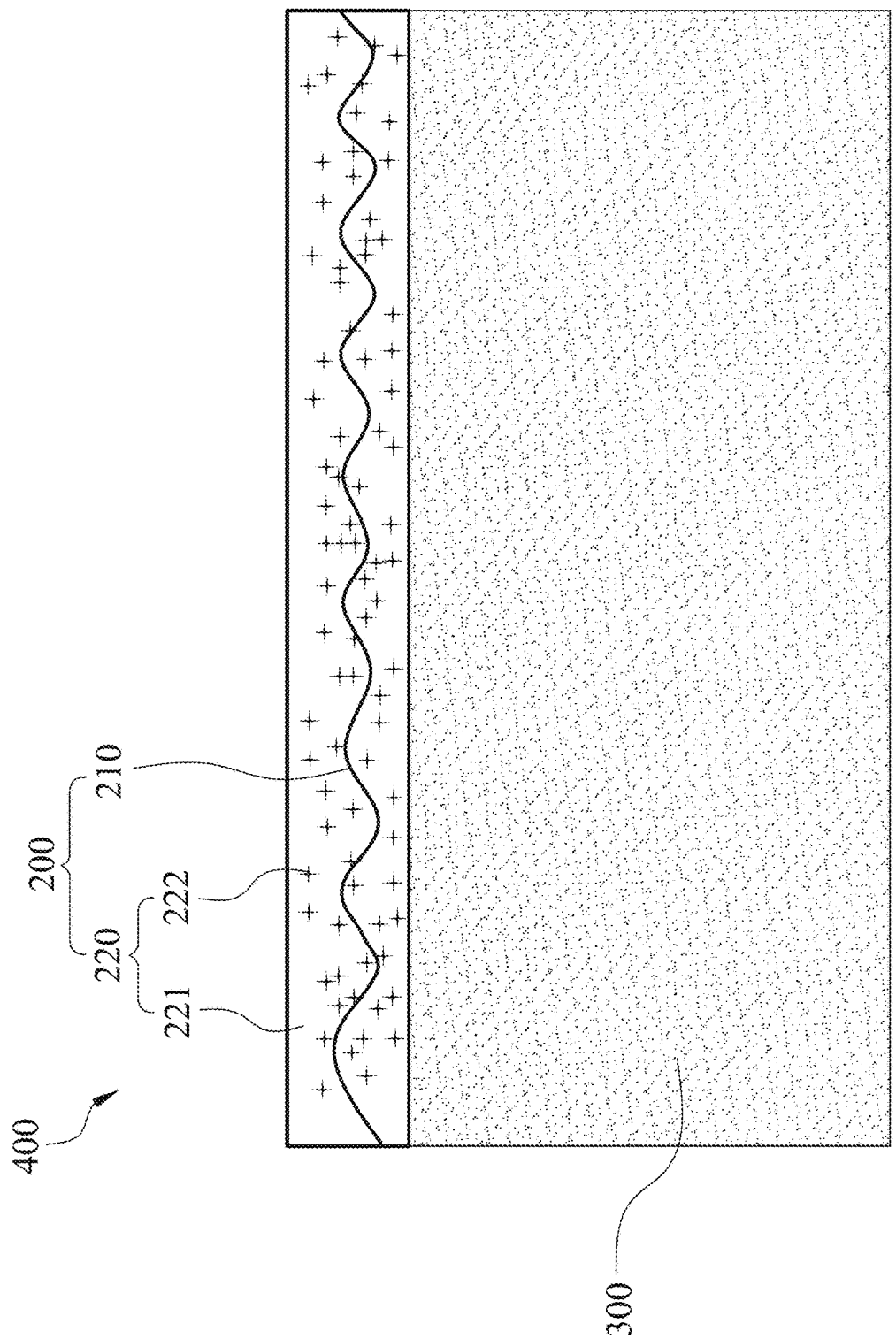
FIG. 3 shows a partial cross-sectional view of a wear-resistant layer structure of a braking track applied to a composite rim according to another embodiment of the present disclosure.

FIG. 3 shows a partial cross-sectional view of a wear-resistant layer structure 200 of a braking track applied to a composite rim 400 according to another embodiment of the present disclosure. The composite rim 400 includes a main body 300, and the main body 300 can be made from carbon fibers and an epoxy resin. The wear-resistant layer structure 200 can be disposed on the main body 300, and includes a fiber fabric 210 and a mixture 220 mixed with the fiber fabric 210. The mixture 220 includes a resin 221 and a plurality of needle-shaped crystals 222 having microscale or nanoscale sizes mixed with the resin 221.

The reinforced prepreg 100 can be used in manufacturing wear-resistant layer structure 200. To be more specific, the reinforced prepreg 100 can be adhered onto the carbon fiber prepreg used for manufacturing the main body 300, and after molding and curing process, the main body 300 of the composite rim 400 is formed. As a result, a wear-resistant layer structure 200 is formed on the surface of the main body 300 to form the braking track of the composite rim 400, and a thickness of the wear-resistant layer structure 200 is within a range of 0.1 mm to 0.5 mm. No additional proceedings, such as coating or laser treatment, are required for the wear-resistant layer structure 200 such that the process is simplified. Preferably, the thickness of the wear-resistant layer structure 200 is within a range of 0.1 mm to 0.2 mm, and the thickness is thin and the weight is light.

Figure 4A:
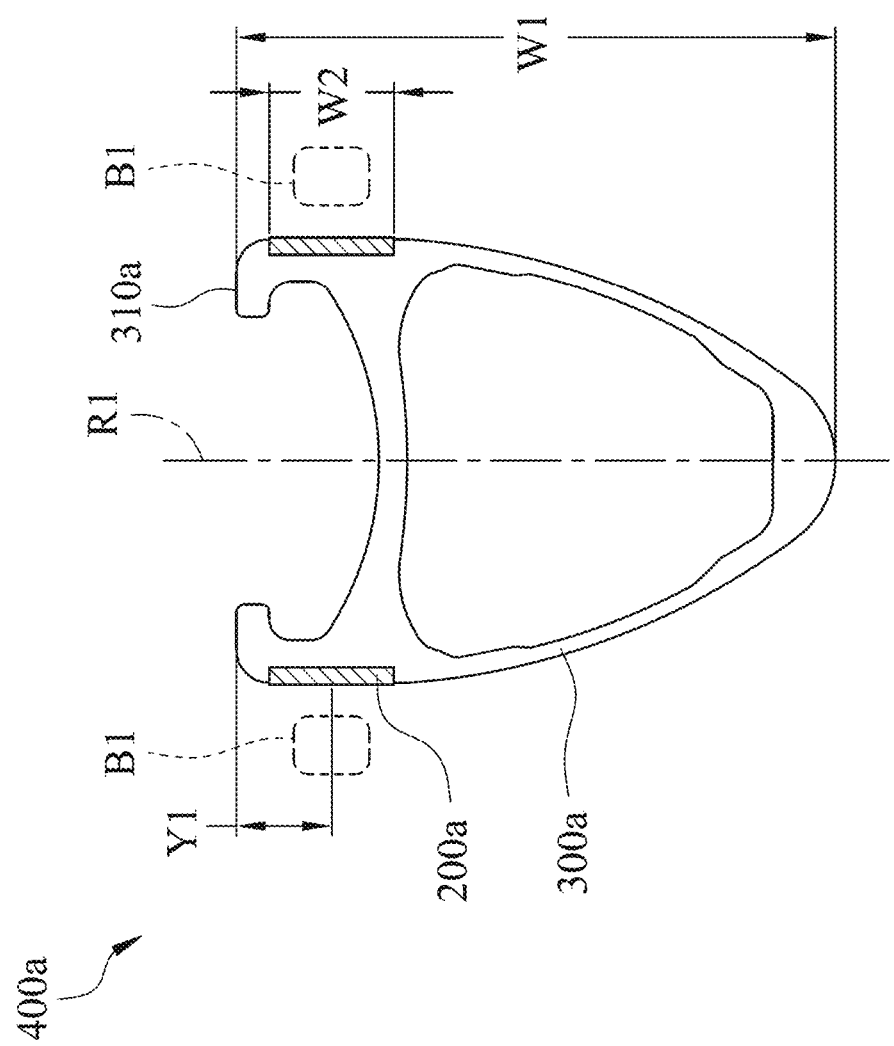
FIG. 4A shows a partial cross-sectional view of a wear-resistant layer structure of a braking track applied to a composite rim according to yet another embodiment of the present disclosure.

FIG. 4A shows a partial cross-sectional view of a wear-resistant layer structure 200a of a braking track applied to a composite rim 400a according to yet another embodiment of the present disclosure. FIG. 4B shows a partial cross-sectional view of a wear-resistant layer structure 200b of a braking track applied to a composite rim 400b according to still yet another embodiment of the present disclosure. FIG. 4C shows a partial cross-sectional view of a wear-resistant layer structure 200c of a braking track applied to a composite rim 400c according to still yet another embodiment of the present disclosure.

As shown in FIG. 4A, a radial outside portion of the composite rim 400a has a first radial width W1. The wear-resistant layer structure 200a applied to a surface of the composite rim 400a has a second radial width W2, and the second radial width W2 is equal to or smaller than the first radial width W1. Precisely, the wear-resistant layer structure 200a is disposed at a surface of the main body 300a. The composite rim 400a is symmetric with respect to a virtual central axis R1. Each of a left side portion and a right side portion thereof is aligned in a radial direction. The second radial width W2 of the wear-resistant layer structure 200a at the radial direction is equal to or smaller than the first radial width W1 of the composite rim 400a. In other words, the wear-resistant layer structure 200a partially covers both the left side and the right side surfaces of the main body 300 and is near the rim flange 310a. When the composite rim 400a is installed to a bike (not shown) and is coordinated with two brake shoes B1, the wear-resistant layer structure 200a on two sides can face to the two brake shoes B1, respectively, and each of the brake shoes B1 can rub against each of the wear-resistant layer structure 200a to brake the composite rim 400a. More preferably, a height Y1 between a central line of the wear-resistant layer structure 200a and the rim flange 310a is equal to a height between a central line of the brake shoe B1 and the rim flange 310a.

As shown in FIG. 4B, the wear-resistant layer structure 200b is partially disposed on the surface of the main body 300b and covers the rim flange 310b. Preferably, the second radial width W2 of the wear-resistant layer structure 200b at the radial direction is equal to or smaller than the first radial width W1 of the composite rim 400b. As shown in FIG. 4C, the wear-resistant layer structure 200c is disposed on the surface of the main body 300c of the composite rim 400c and covers the whole surface of the main body 300c except the rim flange 310c. It is appreciated that the wear-resistant layer structure can be applied to different surface parts of the composite rim according to different demands.

Figure 5C:
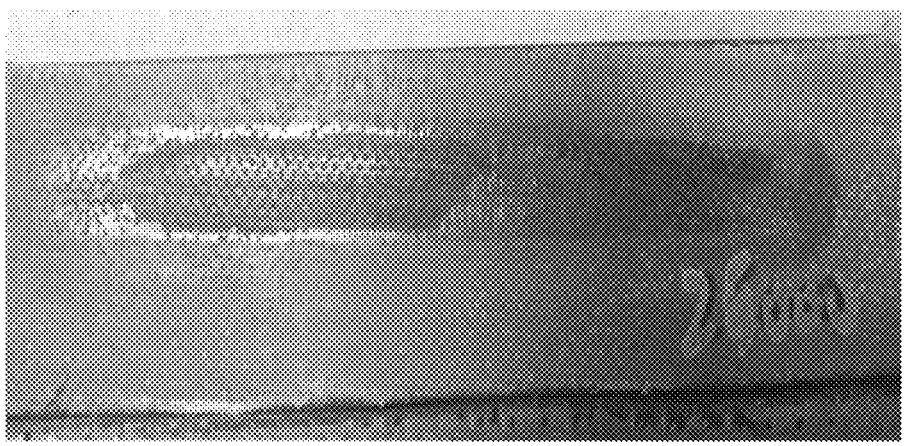
FIG. 5C shows a wear-resistant test result of a second experimental example.
Figure 5B:
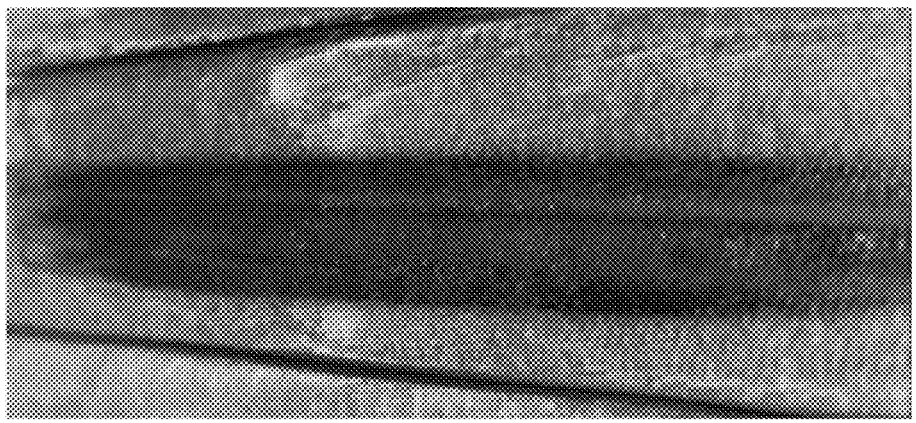
FIG. 5B shows a wear-resistant test result of a first experimental example.
Figure 5A:
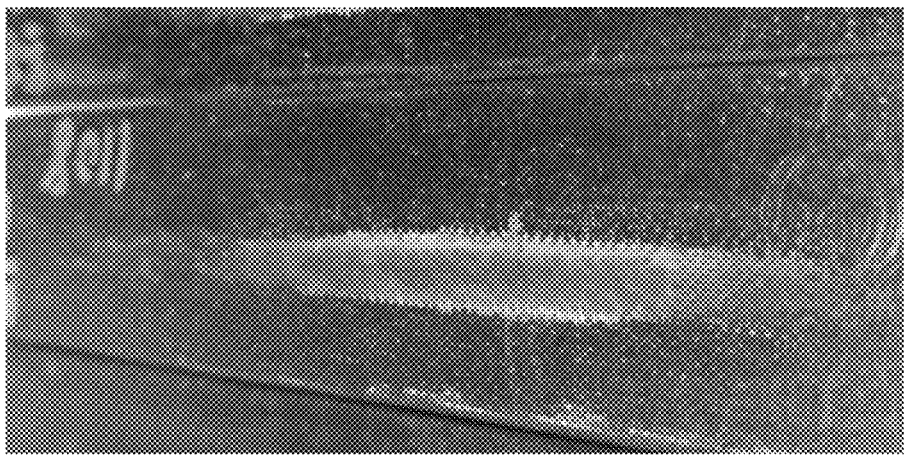
FIG. 5A shows a wear-resistant test result of a first comparison example.

FIG. 5A shows a wear-resistant test result of a first comparison example. FIG. 5B shows a wear-resistant test result of a first experimental example. FIG. 5C shows a wear-resistant test result of a second experimental example.

The wear-resistant layer structure of the first comparison example is composed of a fiber fabric and a resin. The fiber fabric is made of glass fibers, and the resin is an epoxy resin. The wear-resistant layer structure of the first experimental example of the present invention is composed of a fiber fabric and a mixture including a resin and a plurality of needle-shaped crystals. The fiber fabric is made of glass fibers, and the resin is an epoxy resin. Each of the needle-shaped crystals is composed of ZnO, and the content of the needle-shaped crystals in the mixture is 20 phr. The wear-resistant layer structure of the second experimental example of the present invention is composed of a fiber fabric and a mixture including a resin and a plurality of needle-shaped crystals. The fiber fabric is made of LCP fibers, and the resin is an epoxy resin. Each of the needle-shaped crystals is composed of ZnO, and the content of the needle-shaped crystals in the mixture is 20 phr. In the wear-resistant test, a brake pad is used to rub against the wear-resistant layer structures. The load, the frequency and the stroke in the wear-resistant test are 10 kg, 6 Hz, and 85 mm, respectively. After 2,900 test cycles, the wear-resistant layer structure of the first comparison example has serious damage shown in FIG. 5A while the wear-resistant layer structures of the first experimental example and the second experimental example have light damage, as shown in FIGS. 5B and 5C, after about 25,000 test cycles. Hence, it is clear that the abradability of the wear-resistant layer structures of the present invention including the mixture of the resin and the needle-shaped crystals are at least eight times higher than the abradability of the wear-resistant layer structure of the first comparison example which does not include needle-shaped crystals.

Figure 6:
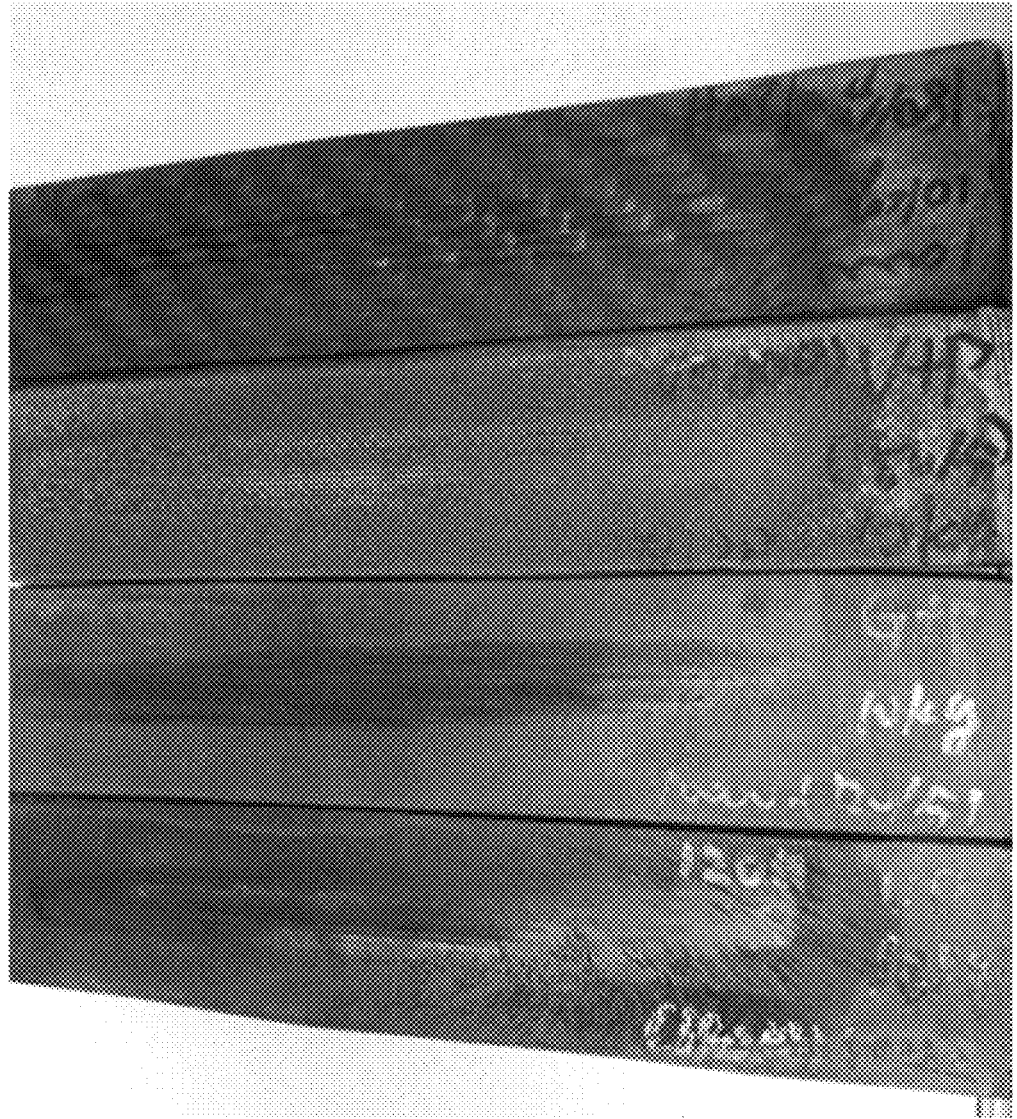
FIG. 6 shows wear-resistant test results in a wet mud circumstance of (A) a second comparison example, (B) the first comparison example, (C) a second experimental example and (D) a third comparison example.
Figure 7C:
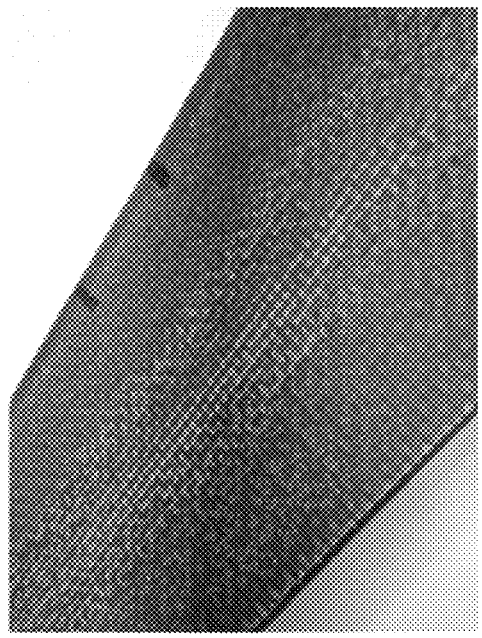
FIG. 7C shows the wear-resistant test result in the wet mud circumstance of the second experimental example.
Figure 7D:
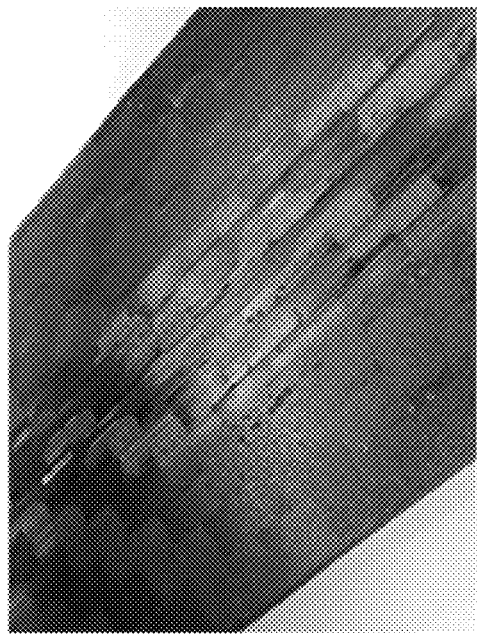
FIG. 7D shows the wear-resistant test result in the wet mud circumstance of the third comparison example.
Figure 7A:
FIG. 7A shows the wear-resistant test result in the wet mud circumstance of the second comparison example.
Figure 7B:
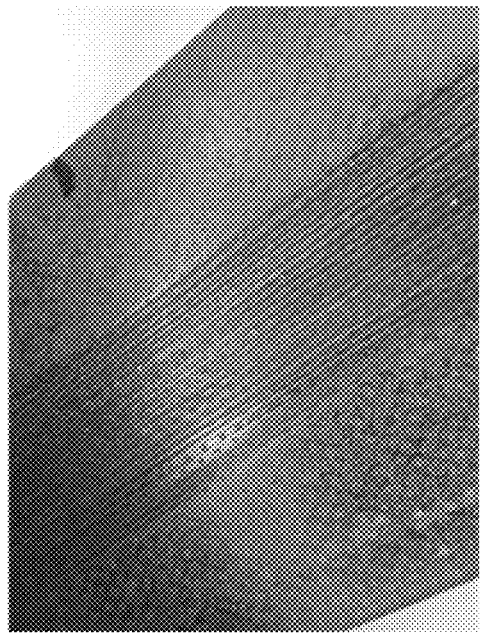
FIG. 7B shows the wear-resistant test result in the wet mud circumstance of the first comparison example.
Figure 8C:
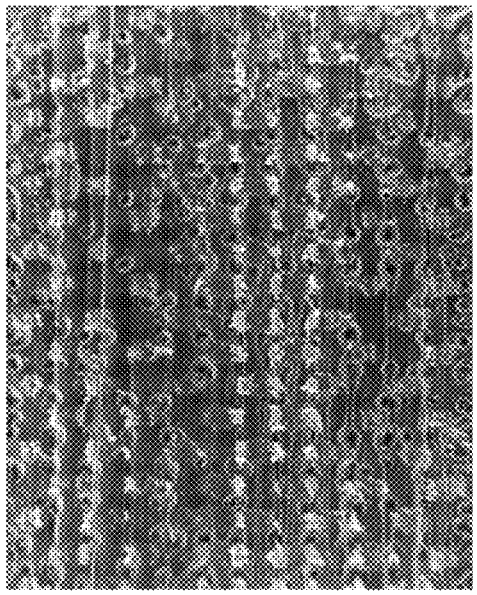
FIG. 8C shows an enlarged view of the wear-resistant test result in the wet mud circumstance of the second experimental example.
Figure 8D:
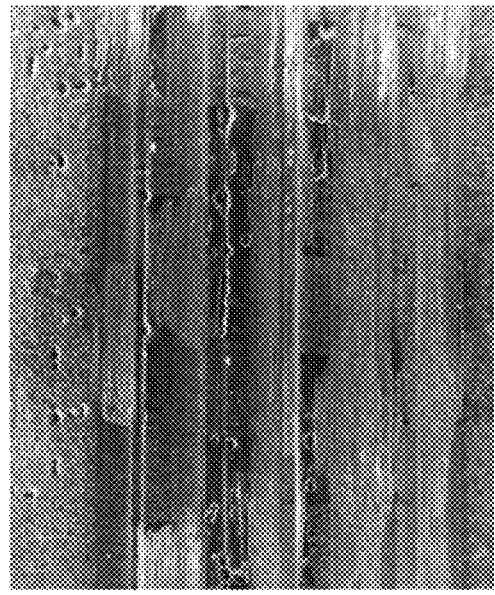
FIG. 8D shows an enlarged view of the wear-resistant test result in the wet mud circumstance of the third comparison example.
Figure 8A:
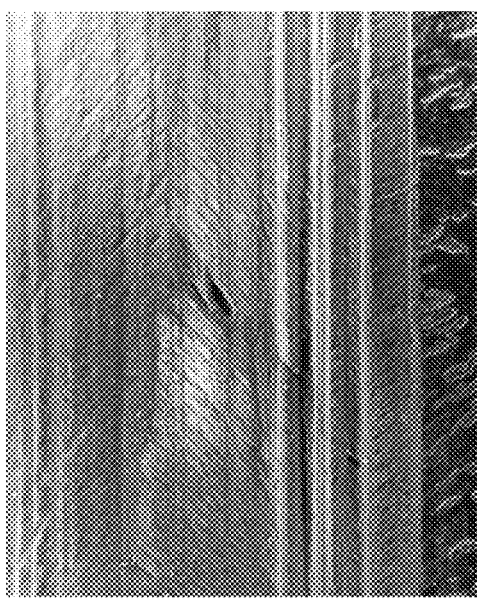
FIG. 8A shows an enlarged view of the wear-resistant test result in the wet mud circumstance of the second comparison example.
Figure 8B:
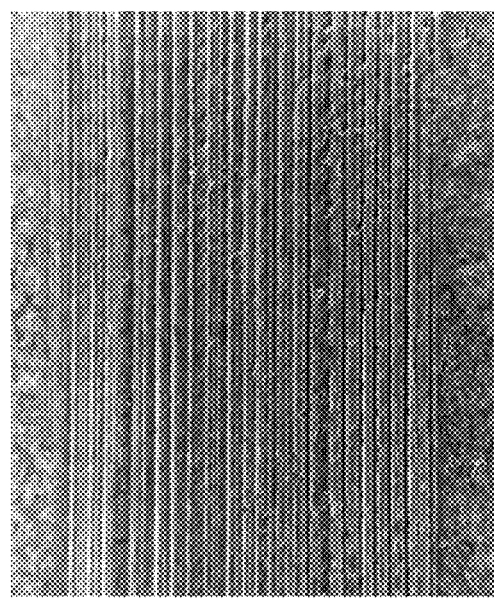
FIG. 8B shows an enlarged view of the wear-resistant test result in the wet mud circumstance of the first comparison example.

FIG. 6 shows wear-resistant test results in a wet mud circumstance of (A) a second comparison example, (B) the first comparison example, (C) the second experimental example and (D) a third comparison example. FIG. 7A shows the wear-resistant test result in the wet mud circumstance of the second comparison example. FIG. 7B shows the wear-resistant test result in the wet mud circumstance of the first comparison example. FIG. 7C shows the wear-resistant test result in the wet mud circumstance of the second experimental example. FIG. 7D shows the wear-resistant test result in the wet mud circumstance of the third comparison example. FIG. 8A shows an enlarged view of the wear-resistant test result in the wet mud circumstance of the second comparison example. FIG. 8B shows an enlarged view of the wear-resistant test result in the wet mud circumstance of the first comparison example. FIG. 8C shows an enlarged view of the wear-resistant test result in the wet mud circumstance of the second experimental example. FIG. 8D shows an enlarged view of the wear-resistant test result in the wet mud circumstance of the third comparison example. The wet mud circumstance may indicate a road condition in a raining day.

The wear-resistant layer structure of the second comparison example is composed of uni-carbon (unidirectional carbon) fibers and a resin, and the resin is an epoxy resin. The wear-resistant layer structure of the third comparison example is composed of a fiber fabric and a resin. The fiber fabric is made of carbon fibers, and the resin is an epoxy resin. During the wear-resistant test in the wet mud circumstance, a brake pad is used to rub against the wear-resistant layer structures. The load and the frequency are 10 kg and 3 Hz, respectively. In order to simulate the wet mud circumstance, mud of 120 microns and water are mixed. The wear-resistant test runs 10,000 test cycles.

As shown in FIGS. 6, 7A, 7B, 7C, 7D, 8A, 8B, 8C and 8D, the wear-resistant structures of the first, second and third comparison examples have serious damage while the wear-resistant structure of the second experimental example has no obvious damage. Hence, the wear-resistant layer structure of the present invention has high abradability.

Figure 9B:
FIG. 9B shows a wear-resistant test result of a third experimental example.
Figure 9A:
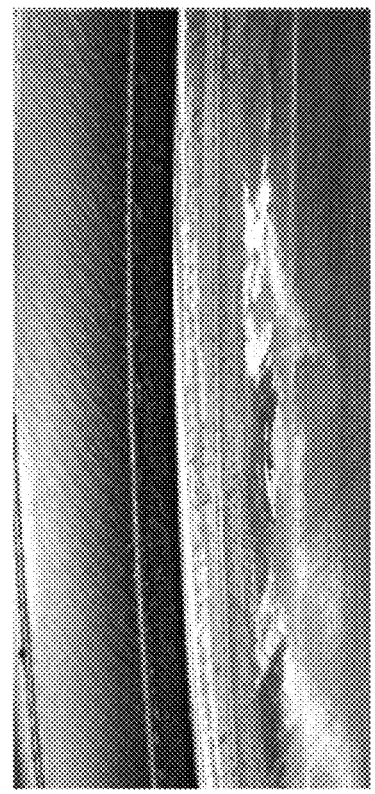
FIG. 9A shows a wear-resistant test result of a forth comparison example.

FIG. 9A shows a wear-resistant test result of a forth comparison example. FIG. 9B shows a wear-resistant test result of a third experimental example. In the fourth comparison example, no wear-resistant layer structure is applied on the composite rim which is conventional and made from carbon fibers to form the braking track. The composite rim of the third experimental example includes the wear-resistant layer structure of the present invention, and the wear-resistant layer structure is composed of a fiber fabric and a mixture including a resin and a plurality of needle-shaped crystals. The fiber fabric is made of LCP fibers, and the resin is an epoxy resin. The needle-shaped crystals are composed of ZnO, and the content of the needle-shaped crystals in the mixture is 20 phr. In the wear-resistant test, a gripping force of 180N is applied on a brake track of the composite rim. The composite rim is braking at a speed of 25 km/h for 7.5 seconds each brake, and the interval between each brake testing is 60 seconds.

After one test cycle, the composite rim of the fourth comparison example has light damage, and, as shown in FIG. 9A, after two test cycles, the composite rim of the fourth comparison example has serious damage. As shown in FIG. 9B, the composite rim of the third experimental example has no obvious damage after about 10 test cycles. Hence, the wear-resistant layer structure of the present invention has high abradability.

Based on the above embodiments and experimental examples of the present invention, the reinforced prepreg and the wear-resistant layer structures do have high abradability. On the contrary, because of the low interfacial strength between the conventional fiber fabric and the resin, even the fiber fabric is not easy damageable, the fiber fabric will separate from the resin easily when the braking track of the composite rim is rubbed by the brake shoes, which results in fiber exposure and structural damage. Since the present invention includes a mixture containing resin and the needle-shaped crystals, the combination between the resin and the fiber fabric can be increased through adding the needle-shaped crystals have needle-shaped structures.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations would be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A reinforced prepreg which is used to be adhered onto a prepreg used for manufacturing a main body of a composite rim and be cured thereon to form a wear-resistant layer structure, the reinforced prepreg comprising:
   a fiber fabric made of liquid crystal polymer fibers; and
   a mixture mixed with the fiber fabric, the mixture comprising:
      a resin; and
      a plurality of needle-shaped crystals having microscale sizes mixed with the resin;
   wherein a content of the needle-shaped crystals in the mixture is within a range of 10 phr to 25 phr.

2. The reinforced prepreg of claim 1, wherein each of the needle-shaped crystals is composed of inorganic nonmetal materials.

3. The reinforced prepreg of claim 2, wherein each of the needle-shaped crystals is composed of ZnO, ZnS or MgO.

4. The reinforced prepreg of claim 1, wherein each of the needle-shaped crystals has a needle diameter and a needle length, the needle diameter is within a range of 0.5 microns to 10 microns, and the needle length is within a range of 10 microns to 100 microns.

5. The reinforced prepreg of claim 1, wherein each of the needle-shaped crystals has a monopod-shaped structure, a bipod-shaped structure, a tripod-shaped structure or a tetrapod-shaped structure.

6. The reinforced prepreg of claim 1, wherein a weight percentage of the mixture in the reinforced prepreg is within a range of 30% to 60%.

7. The reinforced prepreg of claim 6, wherein the weight percentage of the mixture in the reinforced prepreg is within a range of 35% to 45%.

8. A composite rim which is made by curing an assembly comprising a prepreg used for manufacturing a main body of the composite rim and a reinforced prepreg adhered onto the prepreg, the reinforced prepreg forming a wear-resistant layer structure on the main body after being cured, the reinforced prepreg comprising:
   a fiber fabric made of liquid crystal polymer fibers; and
   a mixture mixed with the fiber fabric, the mixture comprising:
      a resin; and
      a plurality of needle-shaped crystals having microscale sizes mixed with the resin;
   wherein a content of the needle-shaped crystals in the mixture is within a range of 10 phr to 25 phr.

9. The composite rim of claim 8, wherein each of the needle-shaped crystals is composed of ZnO, ZnS or MgO.

10. The composite rim of claim 8, wherein each of the needle-shaped crystals has a needle diameter and a needle length, the needle diameter is within a range of 0.5 microns to 10 microns, and the needle length is within a range of 10 microns to 100 microns.

11. The composite rim of claim 8, wherein each of the needle-shaped crystals has a monopod-shaped structure, a bipod-shaped structure, a tripod-shaped structure or a tetrapod-shaped structure.

12. The composite rim of claim 8, wherein a thickness of the wear-resistant layer structure is within a range of 0.1 mm to 0.5 mm.

13. The composite rim of claim 8, wherein a radial outside portion of the composite rim has a first radial width, and the wear-resistant layer structure applied to a surface of the composite rim has a second radial width, wherein the second radial width is equal to or smaller than the first radial width.

* * * * *